L. W. GEEREKEY, DEC'D.
J. A. KETCHERSIDE, ADMINISTRATOR.
RUBBER TIRE PROTECTOR.
APPLICATION FILED AUG. 8, 1916. RENEWED DEC. 4, 1917.
1,254,793.
Patented Jan. 29, 1918.
2 SHEETS—SHEET 1.
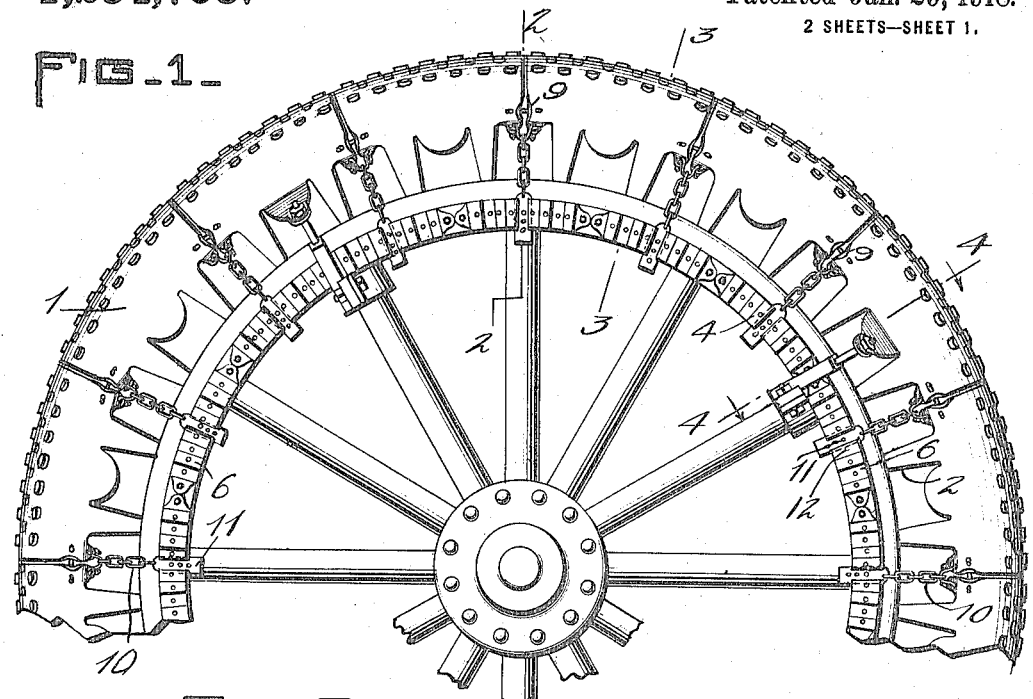
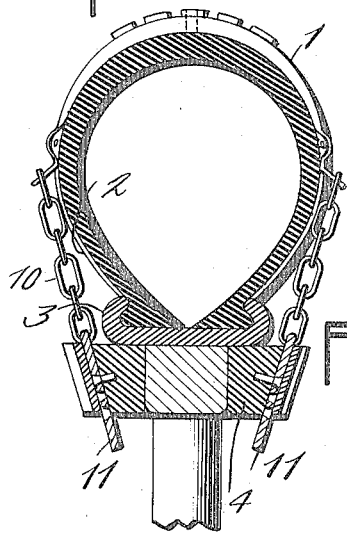
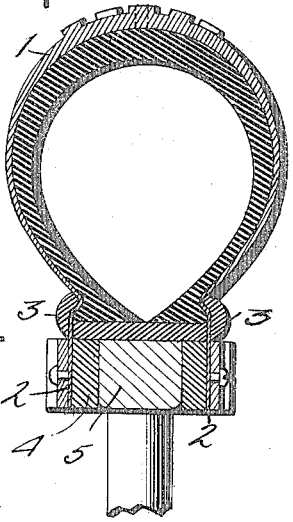
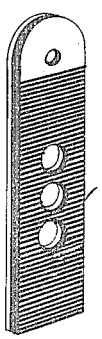
WITNESSES:
INVENTOR
LOUIS W. GEEREKEY,
BY
ATTORNEYS

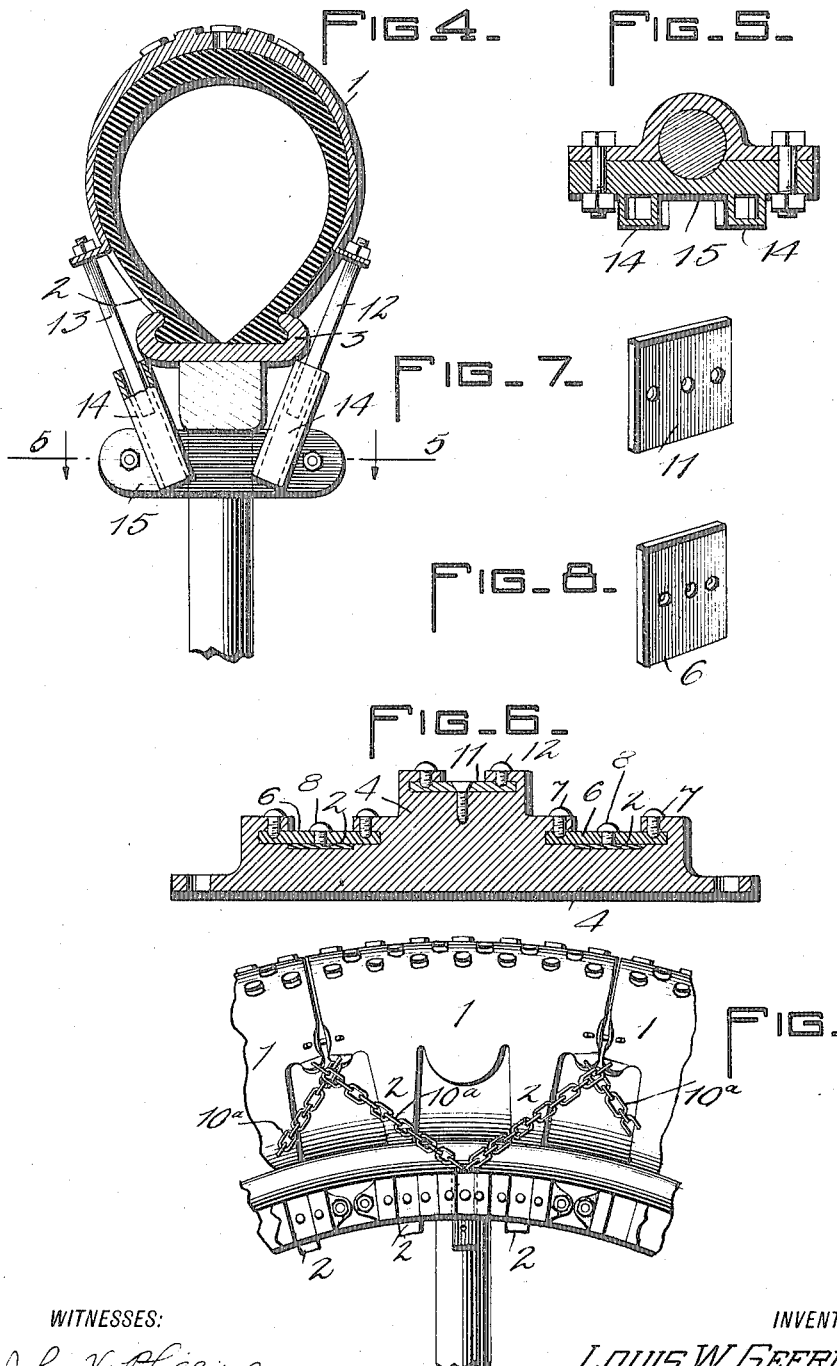

UNITED STATES PATENT OFFICE.

LOUIS W. GEEREKEY, OF DOUGLAS, ARIZONA; J. A. KETCHERSIDE ADMINISTRATOR OF SAID LOUIS W. GEEREKEY, DECEASED.

RUBBER-TIRE PROTECTOR.

1,254,793.   Specification of Letters Patent.   Patented Jan. 29, 1918.

Application filed August 8, 1916, Serial No. 113,690. Renewed December 4, 1917. Serial No. 205,437.

*To all whom it may concern:*

Be it known that I, LOUIS W. GEEREKEY, a citizen of the United States, and a resident of Douglas, in the county of Cochise and State of Arizona, have invented a certain new and useful Improvement in Rubber-Tire Protectors, of which the following is a specification.

My invention is an improvement in the type of coverings or protectors for pneumatic wheel tires which are formed of metal sections conforming to the size and shape of the tire and suitably secured to the wheel rim or spokes.

The details of construction, arrangement, and combination of parts are as hereinafter described and illustrated in the accompanying drawings, in which:

Figure 1 is a side elevation of a portion of an automobile wheel, with my improved covering and protector applied;

Fig. 2 is a cross section on the line 2—2 of Fig. 1;

Fig. 3 is a cross section on the line 3—3 of Fig. 1;

Fig. 4 is a cross section on the line 4—4 of Fig. 1;

Fig. 5 is a horizontal section on the line 5—5 of Fig. 4;

Fig. 6 is an enlarged longitudinal section of one of the brackets applied to the side of the wheel rim;

Figs. 7 and 8 are perspective views of certain plates employed in connection with the aforesaid brackets for securing the covering and protector sections to a pneumatic tire;

Fig. 9 is a perspective view of one of the plates to which the tire sections are connected by chains;

Fig. 10 is a side view of a portion of an automobile wheel showing a modification in the attachment of chains which secure the tire covering and protector sections in place.

In Figs. 1, 2, 3, and 4, tire covering and protecting sections 1 are shown fitted to the pneumatic tire of an automobile wheel, the same being constructed of metal and having their edges prolonged inwardly in the form of tapered tongues 2, the same extending inwardly and passing through slots in the metal wheel rim 3, as shown in Fig. 3. The said tongues are secured to brackets 4, as shown in Figs. 3 and 6, the said brackets being secured by screw bolts to the side of the automobile wheel felly 5.

The brackets are constructed with undercut slots adapted to receive the edges of plates 6, see Figs. 6 and 7, which are secured by clamping screws 7, and other screws 8 pass through said plates 6 and engage the tongues 2. The said plates are adapted to slide laterally into grooves formed by the undercuts.

The tread portion of the cover sections 1 is made sufficiently thick to endure the shock and wear incident to use, and the tongues 2 are reduced not only in thickness but also in width, so that they have sufficient resiliency to adapt them to yield to conform to the varying bulges of the pneumatic tire under different pressures.

The sections 1 are secured on the pneumatic tire by chains 10 arranged radially, their outer ends being engaged with lugs formed on the adjoining ends of the cover sections, while their inner ends are attached to flat elongated plates 11, as shown in Figs. 1 and 2. The said plates 11 are slidably adjustable in undercut slots formed in the side brackets 4, above referred to, and are secured by screws 12. The plates have a series of holes, as shown in Fig. 9, the same being adapted to receive the said screws and permit radial adjustment of the plates, as required to hold the cover sections properly on the wheel tire. As shown in Fig. 2, the plates incline outwardly in order to hold the chains out of contact with the tire. As shown in Figs. 1, 2, and 10, the ends of the tire protecting sections are connected at 9 by means of wire clips.

As shown in Figs. 1 and 4, I provide means for preventing "creeping," the same consisting of rods 13 whose outer ends are attached to lugs on the tire covering sections, and whose inner ends slide in elongated sockets 14 that are rigidly attached to cross bars 15 applied and secured to the spokes of the wheel. The rods and sockets are inclined outwardly at a sufficient angle to prevent contact with the tire.

Fig. 10 illustrates a modification in the arrangement of chains 10ª, the same being inclined at an angle of about forty-five degrees, and crossing each other, in place of the radial arrangement shown in Figs. 1 and 2. With chains thus arranged they exert tension on the tire-covering sections for preventing creeping.

As shown in Figs. 1 and 10, the portions of the side edges of the tire-covering sections which intervene between the tongues 2, extend inwardly and are curved so as to protect the underlying portion of the tire from injury.

Air vent holes are provided in the sections 1, as illustrated by full lines Fig. 4 and dotted lines Figs. 2, 3.

I claim:—

The combination with a wheel rim and tire, of metal covering and protecting sections, means for securing them on the tire, which consist of chains and plates secured thereto and brackets applied to the wheel felly and having slots for receiving the said plates, and means for securing the latter adjustably, as described.

LOUIS W. GEEREKEY.

Copies of this patent may be obtained for five cents each, by addressing the "Commissioner of Patents, Washington, D. C."